United States Patent [19]

Plichta

[11] Patent Number: 5,775,096
[45] Date of Patent: Jul. 7, 1998

[54] PROCESS FOR OPERATING A REACTION-TYPE MISSILE PROPULSION SYSTEM AND MISSILE PROPULSION SYSTEM

[76] Inventor: Peter Plichta, Bruhnstrasse 6a, D-40225 Düsseldorf, Germany

[21] Appl. No.: 663,089

[22] PCT Filed: Oct. 16, 1995

[86] PCT No.: PCT/DE95/01431

§ 371 Date: Jul. 18, 1996

§ 102(e) Date: Jul. 18, 1996

[87] PCT Pub. No.: WO96/12688

PCT Pub. Date: May 2, 1996

[30] Foreign Application Priority Data

Oct. 20, 1994 [DE] Germany .............. 44 37 524.7

[51] Int. Cl.[6] ........................................ F02K 9/42
[52] U.S. Cl. .................. 60/209; 60/214; 60/39.461
[58] Field of Search ................... 60/205, 208, 209, 60/210, 214, 217, 39.461

[56] References Cited

U.S. PATENT DOCUMENTS

| | | | |
|---|---|---|---|
| 3,665,862 | 5/1972 | Lane | 102/103 |
| 4,139,403 | 2/1979 | Baum et al. | 149/88 |
| 5,224,663 | 7/1993 | Criswell | 244/1 R |

*Primary Examiner*—Louis J. Casaregola
*Attorney, Agent, or Firm*—Herbert Dubno; Yuri Kateshov

[57] ABSTRACT

A method for accelerating a vehicle in the atmosphere, space or aerospace includes the steps of supplying a propellant having silicone hydride compounds into a combustion chamber, compressing air and delivering compressed air into a ring formed with a plurality of circumferential orifices which open into the combustion chamber, reaching thereby temperatures of about 3000° C., cracking nitrogen molecules present in the air at the temperature which attack the silicon atoms to generate great mass.

9 Claims, 1 Drawing Sheet

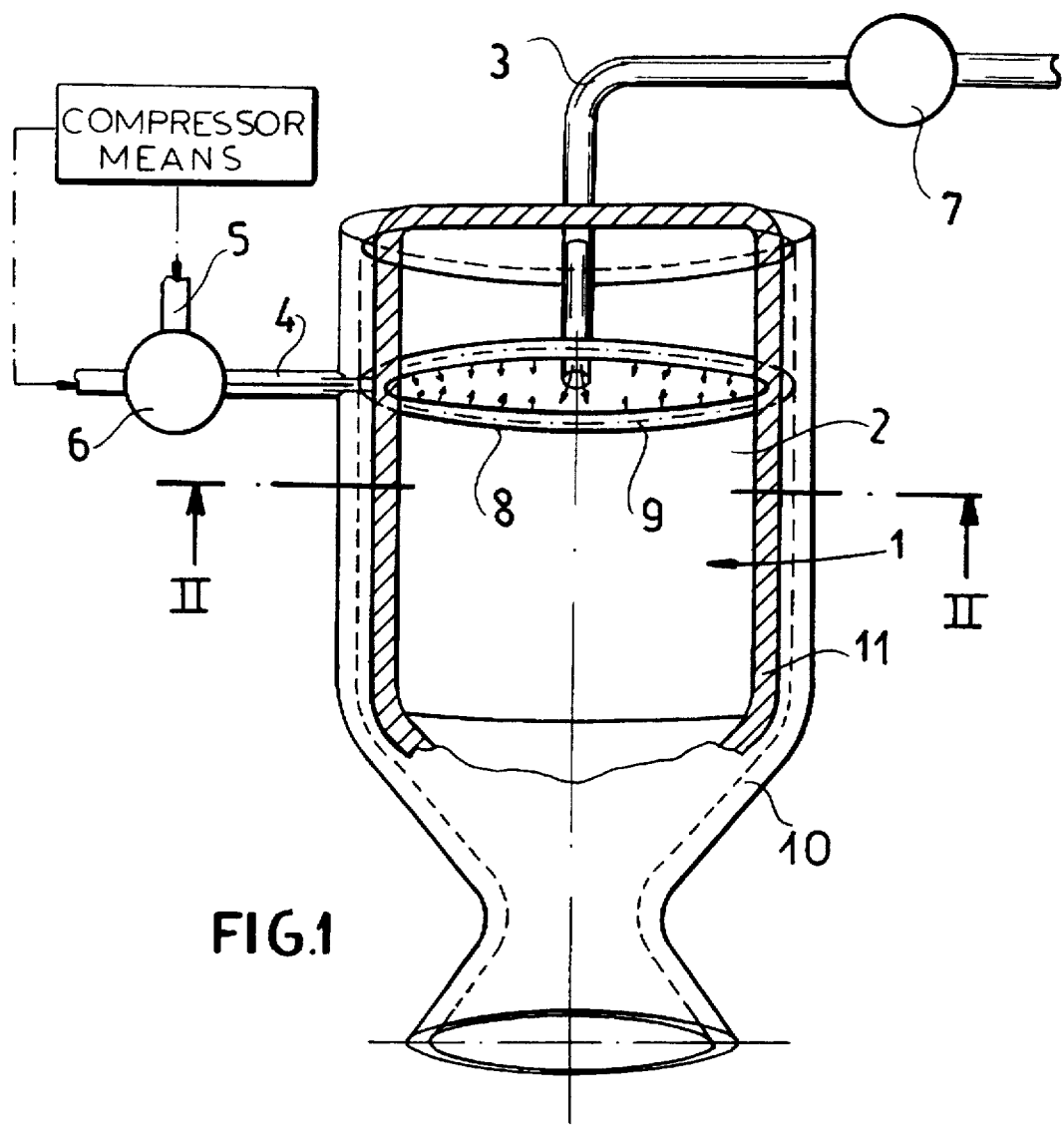
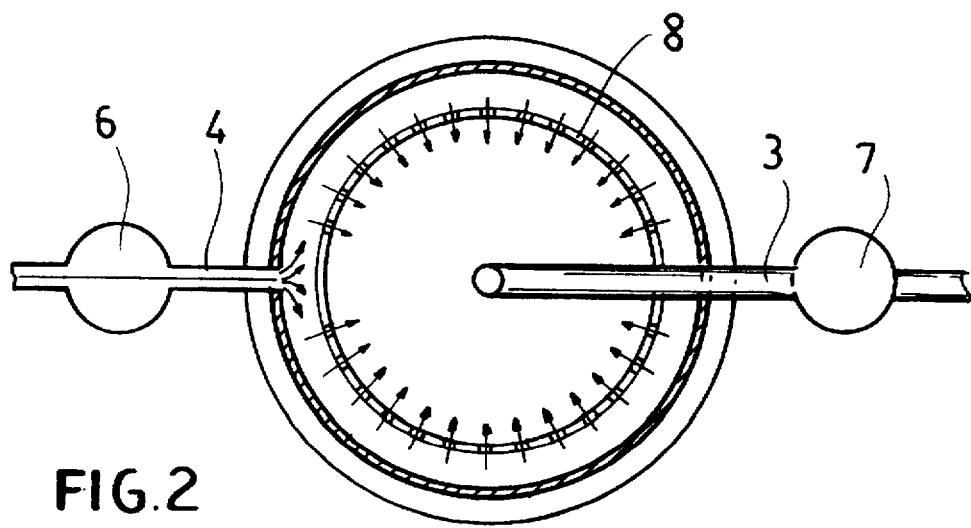

PROCESS FOR OPERATING A REACTION-TYPE MISSILE PROPULSION SYSTEM AND MISSILE PROPULSION SYSTEM

CROSS REFERENCE TO RELATED APPLICATIONS

This application is a national phase application of PCT/DE95/01431 filed 16 Oct. 1995 and based, in turn, on German National Application P44 375 24.7 filed 20 Oct. 1994 under the International Convention.

FIELD OF THE INVENTION

The present invention is directed to a process for operating a reaction-type missile propulsion system. Furthermore, the invention refers to the formation of the missile propulsion system.

BACKGROUND OF THE INVENTION

In the rocket technique, for such cases requiring high specific thrust normally liquid hydrogen is used as propellant and is reacted with oxydants, as for instance liquid oxygen and liquid fluorine (outside of the atmosphere). However, with these propellant combinations the high specific thrust is in contrast to the need of large container volumes for the propellant components and the special expense for the storing of the same. The large container volumes are a consequence of the low specific density of the cited propellant combinations for which primarily hydrogen is responsible. The special expense for the storing results from the extremely low boiling points of the propellant components.

For the removal of the above-cited disadvantages one has already proposed the use of silicon hydride and silicon amine as rocket propellant (German disclosure letter 22 31 008). In this connection tetrasilane ($Si_4H_{10}$) has been cited. However, tetrasilane is extremely self-inflammable and cannot be prepared in a simple manner.

Silicon hydrides, preferably silahe oils, have been suggested as rocket propellants in DE 42 15 835 C2. The preparation of such silane oils is described in German patent 21 39 155, wherein especially the preparation of the oil mixture $Si_5H_{12}$ up to $Si_{10}H_{22}$ is described. Surprisingly, such silane oils are safe with regard to handling and are especially suited as rocket propellant on account of their high specific density and their high energy. This safety with regard to handling is surprising since the lower silanes cannot be used as propellants on account of their extraordinary insecurity.

However, also in accordance with these suggestions it was always emanated from the fact that the silane oils are burned together with liquid oxygen, liquid chlorine or fluorine so that, also in this case, on principle the oxidizing agent has to be carried along.

As regards the propulsion of missiles within the earth's atmosphere, moreover jet engines are known. Jet engines have the advantage that they use the oxygen of the atmosphere as oxidizing agent so that a specific oxidizing agent has not to be carried along. However, in such a case the nitrogen contained in the air as inert gas (about 80%) has to be co-accelerated and to be co-heated. Since the velocity of the combustion gases depends on the temperature, the power of this process is limited and can no more be increased technically.

OBJECT OF THE INVENTION

It is the object of the invention to provide a process for operating a reaction-type propulsion system of a missile which is characterized by an especially high efficiency.

SUMMARY OF THE INVENTION

This object is achieved by reacting silicone hydride compounds with nitrogen and/or nitrogen compounds at high temperatures in the presence of an oxidizing agent for the hydrogen of the silicon hydride compounds in a combustion chamber.

The $N_2$ molecule as such, notwithstanding its triple bond, is extremely inactive and tends to open its linkage only with electron bombardment, for instance in thunderstorms, and to react with oxygen so that nitric oxides are formed. However, above 1400° C. hot nitrogen reacts with finely distributed silicon and forms silicon nitride $Si_3N_4$. The reasons for this nitrogen combustion can be found in the fact that silicon, in contrast to carbon, cannot enter into double bonds or triple bonds. Nitrogen shows an especially good reaction performance with silicon hydride compounds. The invention takes advantage of this recognition and uses intentionally nitrogen or nitrogen compounds for the reaction with silicon hydride compounds whereby an especially efficient propulsion system can be obtained. Nitrogen is at disposal in big amounts, especially within the atmosphere, so that a high efficiency with low costs results.

Special advantages are obtained if the nitrogen of the earth's atmosphere is used for the reaction. In this case the missile has not to carry along oxidizing agents for the silicon hydride compounds since the earth's atmosphere consists of nitrogen ($N_2$) for about 80%. Accordingly, with this variant of the process air, especially compressed air, is introduced into the combustion chamber of the missile and is caused to react with the silicon hydride compounds.

When burning silicon hydride compounds, especially silane oils, with compressed air the oxygen portion reacts with the hydrogen of the silane chain in accordance with the equation $$4H+O_2=2H_2O.$$

In this hydrogen-oxygen-combustion temperatures of about 3000° C. are reached. This temperature is sufficient in order to crack the $N_2$ molecule which is presented by the supply of the compressed air. According to the equation $$4N+3Si=Si_3N_4$$

the nitrogen radicals now attack the free silicon atoms with extreme vehemence. Silicon nitride is formed which has a molecular weight of 117 and thus is nearly three times as heavy as carbon dioxide. Accordingly, the corresponding repulsion effect is substantially improved compared with the prior art.

Of course, the cited reaction occurs only with correspondingly high temperatures. In the air silane oils after ignition burn only to develop red-brown amorphous silicon monoxide since the combustion substance has not enough oxygen on account of the rapidity of the combustion. No reaction with nitrogen takes place since nitrogen does not form any free radicals under these conditions.

The inventive process can be used not only for operating spacecrafts but also for operating missiles within the earth's atmosphere. For the first case the nitrogen and the oxidizing agent have to be carried along as "oxidizing agent" since they are not present within the space. However, in the second case, as mentioned above, the nitrogen present within the earth's atmosphere can be used so that essential advantages result by this in contrast to customary jet engines which can use only about 20% of the earth's atmosphere since it is no more necessary to use only about 20% of the atmosphere ($O_2$ content) for the combustion but rather additional by about 80% ($N_2$ content) can be used. The silicon nitride ($Si_3N_4$) essentially formed by the nitrogen combustion has a substantially higher molecular weight than the carbon dioxide developing with jet engines of the prior art whereby an especially good efficiency of the propulsion system is obtained since, according to the pulse equation, not only the velocity but also the mass of the gases play a role.

According to an improvement of the inventive process nitrogen compounds are introduced into the combustion chamber in addition to air. This process variant is advantageous especially for a case according to which an effective nitrogen combustion is to be maintained in high altitudes (with decreasing density of the atmosphere). Then, for instance, liquid $N_2O_4$ or nitric acid $HNO_3$ are introduced into the combustion chamber. Accordingly, dependent on the field of application the invention provides that preferably the nitrogen contained within the earth's atmosphere is used for the combustion. However, if the same is not present or is only present in a restricted manner, nitrogen or nitrogen compounds are carried along in the missile and are used for the combustion.

Preferably, the reaction is caused to occur at a temperature above 1400° C. since below this value a combustion of the silicon hydride compounds, especially of the silane oils, with nitrogen can be realized only in a difficult manner or cannot be realized at all. Preferably, one works with increased temperatures of 2500°–3000° C. which develop during the hydrogen-oxygen-combustion resulting from the reaction of the oxygen portion of the earth's atmosphere with the hydrogen portion of the silane chains of the silicon hydride compounds.

Preferably, silane oils, especially such having a chain length of $Si_5H_{12}$ to $Si_9H_{20}$, are used as silicon hydride compounds. Such silane oils are described in the already mentioned German patent 21 39 155. Surprisingly, such long-chained silanes are no more self-inflammable in the air. They have the consistency of paraffine oils and can be simply manufactured in a technical scale. They can be pumped so that they can be supplied to a suitable combustion chamber without any problems.

Furthermore, the invention is directed to a propulsion system of a missile for implementing the above-cited process. This propulsion system is characterized by the feature that it is realized as rocket propulsion system and includes a combustion chamber, a supply line for the silicon hydride compounds into the combustion chamber, a supply line for the nitrogen and/or the nitrogen compounds leading into the combustion chamber and a supply line for the oxidizing agent leading into the combustion chamber.

Preferably, the supply lines for the nitrogen and/or the nitrogen compounds and/or the oxidizing agent are connected to a source of compressed air. In this case, the air is appropriately taken from the atmosphere surrounding the missile, is compressed by means of compressors and is introduced into the combustion chamber. Preferably, the introduction is realized annularly into the combustion chamber while the silicon hydride compounds are preferably introduced into the center of the ring. As regards the remaining aspects, the propulsion system is formed as known rocket propulsion system and has a corresponding outlet opening for the combustion gases which is provided with a throttle for increasing the gas velocity.

Accordingly a novel thrust motor has been provided which represents a mixture between a jet engine and a known liquid rocket propulsion system. Thus according to the invention the advantages of both known systems are combined. The inventive propulsion system operates according to the reaction or repulsion principle, i.e. it is comparable with a rocket propulsion system and utilizes the high efficiency thereof, however, preferably uses the nitrogen present in the atmosphere for the combustion of the silicon hydride compounds so that no specific oxidizing agent has to be carried along in the missile. Furthermore, the advantage with respect to a conventional jet engine consists in the feature that one can desist from mechanical elements within the combustion chamber.

The housing of the combustion chamber is designed for correspondingly high pressures and temperatures. Appropriately, it includes a cooling jacket. The inner chamber can be protected by a lining consisting of ceramics or noble metals. Furthermore, the housing of the combustion chamber preferably can consist of titanium at least partly.

If not enough $O_2$ is present for the combustion to burn all the H atoms of the silicon hydride compounds (silane chains) and to reach a sufficient high temperature for the cracking of the $N_2$ molecule, if necessary, $O_2$ has to be introduced into the combustion chamber, preferably as nitric oxide. In this case $O_2$ operates as "ignition medium" for the following N reaction.

In other respects, the introduction of the propellant into the combustion chamber is preferably realized automatically in response to the pressure and the temperature within the combustion chamber.

Preferably, the silicon hydride compounds are introduced into the combustion chamber as silane oils by means of a suitable pump. As mentioned above, such silane oils are adapted to be pumped.

BRIEF DESCRIPTION OF THE DRAWING

The above and other objects, features, and advantages will become more readily apparent from the following description, reference being made to the accompanying drawing in which:

FIG. 1 is a cross-sectional side view of a missile propulsion;

FIG. 2 is a cross-sectional view of the inventive system taken along lines II—II in FIG. 1.

SPECIFIC DESCRIPTION

As seen in FIG. 1, the propulsion system 1 includes a combustion chamber 2 the housing 11 of which consists of a suitable high-temperature-resistant material, for instance metal or ceramics. Preferably, the housing consists at least partly of titanium. The housing is surrounded by a suitable cooling jacket 10.

Moreover, the combustion chamber is formed as the combustion chamber of a known rocket propulsion system and has at its lower end in FIG. 1 an outlet opening which is provided with a corresponding throttle for increasing the velocity of the combustion gases.

A supply line 4 for compressed air which is compressed by the compressor schematically shown at 6 opens into the combustion chamber. The supply line 4 feeds the compressed air into a ring 8 disposed within the combustion chamber and provided with a plurality of inwardly directed nozzle oulet openings 9 through which the compressed air is introduced into the interior of the combustion chamber. Furthermore, a supply line 3 for silane oils, which are introduced into the combustion chamber by means of a pump 7, opens into the combustion chamber into the interior of the ring 8. The introduction can be realized by means of a suitable injection device (not shown).

The oxygen portion of the compressed air reacts with the hydrogen of the silane chain for the formation of $H_2O$. With the corresponding hydrogen-oxygen-combustion sufficiently high temperatures are reached in order to crack the $N_2$ molecule. Now, the free nitrogen radicals attack the free silicon atoms whereby the desired nitrogen combustion develops. $Si_3N_4$ is formed. If not enough air is present, additional nitrogen compounds, as for instance $NO_2$ or $HNO_3$, can be introduced into the combustion chamber, as schematically shown by the conduit 5.

Accordingly, as indicated above with the inventive process nitrogen for the reaction with the silicon atoms and an oxidizing agent for the reaction with the hydrogen atoms of the silicon hydride compounds are required. Both components can be added to the silicon hydride compounds in a separated condition, as mixture or as compound. In addition a mixture, i.e. air, is especially suited since air is present in the atmosphere. In this case the oxygen of the air is used as oxidizing agent, as stated above. However, also compounds can be added to supply the oxidizing agent and the nitrogen. For this, for example, the nitric oxides ($NO_x$) already mentioned above can be used which supply the corresponding oxygen as oxidizing agent as well as the nitrogen. Another preferred compound is tetrafluorohydrazine which supplys not only the required nitrogen but also the required oxidizing agent, namely fluorine.

I claim:

1. A method of operating a reaction-type missile propulsion system comprising the steps of:

combusting in a reaction-type missile a hydrogen of silane oil selected from the group which consists of silane oils from $Si_5H_{12}$ to $Si_9H_{20}$ in the presence of an agent supplying oxygen to produce water and generate a temperature from 1400° C. 0 to 3000° C. and capable of inducing reaction of silicon with nitrogen; and reacting nitrogen of air or nitrogen compounds carried along by the missile with the silicon of the silane oils for generation of silicon nitride at said temperature.

2. A method for propelling a reaction-type missile, comprising the steps of:

a) delivering a propellant including silicon hydride compounds in a form of silane oils having a chain length from $Si_5H_{12}$ to $Si_9H_{20}$ into a confined combustion chamber on said missile;

b) delivering air including nitrogen into the confined combustion chamber, generating thereby a temperature of between 1400° C. and 3000° C. in the combustion chamber resulting from a reaction $4H+O_2=2H_2O$ wherein $O_2$ is oxygen contained in the compressed air and H is hydrogen contained in the silicon hydride compounds;

c) activating nitrogen molecules at the temperature thereby providing nitrogen radicals which react with free silicon atoms of said silicon hydride compounds in a reaction $4N+3Si=Si_3N_4$ to form silicon nitride having a high molecular weight; and d) ejecting the $H_2O$ and $Si_3N_4$ thus formed from said chamber to propel said missile.

3. The method defined in claim 2 wherein said step (b) includes compressing said air in a compressor provided in the vehicle and delivering it through a ring formed with a plurality of circumferential orifices opening into said chamber.

4. The method defined in claim 3 further comprising the step of delivering nitrogen compounds to said chamber separately from ambient air.

5. The method defined in claim 2 further comprising the step of controlling the temperature in the combustion chamber.

6. A missile propulsion system, comprising:

means on a missile forming a confined combustion chamber;

first supply means for delivering a propellant including a silicon hydride compound into said chamber;

second supply means for delivering an oxidizing agent into said chamber;

third supply means for introducing a reactant including a group consisting of nitrogen or nitrogen compounds into said chamber;

compressor means operatively connected with said second and third supply means for compressing respective mediums supplied by the second and third supply means before entering said combustion chamber; and an annular ring in said chamber and provided with a plurality of orifices which are formed along a circumference of the ring and open into said chamber, said annular ring being connected with said second and third supply means and distributing the compressed oxidizing agent and the reactant through said orifices, said oxidizing agent reacting with a hydrate component of said silicon hydride compound in said chamber to generate a temperature of between 1400° C and 3000° C and effecting formation of nitrogen radicals attacking finely distributed silicon atoms to form silicon nitride $Si_3N_4$.

7. The system defined in claim 6 wherein said first supply means includes a source of silicon hydride compounds in the form of silane oils.

8. The system defined in claim 6 wherein said combustion chamber is provided with an outer cooling jacket.

9. The system defined in claim 6 wherein said combustion chamber is made at least in part of titanium.

* * * * *